United States Patent
Johri

(10) Patent No.: US 10,333,923 B2
(45) Date of Patent: Jun. 25, 2019

(54) AUTHENTICATION BASED ON VISUAL MEMORY

(71) Applicant: Rajul Johri, West Jordan, UT (US)

(72) Inventor: Rajul Johri, West Jordan, UT (US)

(73) Assignee: Rajul Johri, West Jordan, UT (US)

( * ) Notice: Subject to any disclaimer, the term of this patent is extended or adjusted under 35 U.S.C. 154(b) by 230 days.

(21) Appl. No.: 15/188,986

(22) Filed: Jun. 22, 2016

(65) Prior Publication Data

US 2016/0352722 A1 Dec. 1, 2016

Related U.S. Application Data

(63) Continuation-in-part of application No. 13/589,159, filed on Aug. 19, 2012, now abandoned.

(51) Int. Cl.
*H04L 9/32* (2006.01)
*G06F 21/00* (2013.01)
(Continued)

(52) U.S. Cl.
CPC ............ *H04L 63/083* (2013.01); *G06F 3/041* (2013.01); *G06F 21/36* (2013.01); *G06Q 20/204* (2013.01); *G06Q 20/206* (2013.01); *G06Q 20/325* (2013.01); *G06Q 20/3278* (2013.01); *G06Q 20/352* (2013.01); *G06Q 20/40* (2013.01); *G06Q 20/401* (2013.01); *G06Q 20/4014* (2013.01);
(Continued)

(58) Field of Classification Search
CPC ......... G06F 21/36; G06F 21/31; H04L 63/083
See application file for complete search history.

(56) References Cited

U.S. PATENT DOCUMENTS 8,117,458 B2    2/2012 Osborn, III et al.
2004/0230843 A1*  11/2004 Jansen ................. G06F 21/36
                                                              726/7
(Continued)

OTHER PUBLICATIONS

V. Kumar, M. K. Gupta, A. Chaturvedi, A. Bhardwaj and M. P. Singh, "Click to Zoom-Inside Graphical Authentication," 2009 International Conference on Digital Image Processing, Bangkok, 2009, pp. 238-242. (Year: 2009).*

(Continued)

*Primary Examiner* — Alexander Lagor

(57) ABSTRACT

Passwords are used in various system access applications in order to ascertain that the user seeking access to a system resource is indeed the person with said access. Passwords are usually supposed to be entered through a keyboard and are a combination of alphanumeric values. With the advent of devices equipped with visual displays and touch inputs, it is possible to create a system which utilizes a person's visual memory to authenticate the person.
A system and method is described which uses multiple images to perform authentication. This system does not require its user to input a text value as a password. The password is created by user's actions. These actions are in the form of selecting a segment on a displayed image. Few different systems are described. One system is capable of creating variable passwords which by design keep changing from one authentication attempt to another. Another system uses one high resolution image to effectively hide the password in an image with lots of detail.

1 Claim, 15 Drawing Sheets

(51) Int. Cl.

| | |
|---|---|
| *G06F 21/36* | (2013.01) |
| *H04L 29/06* | (2006.01) |
| *G06F 3/041* | (2006.01) |
| *H04W 4/80* | (2018.01) |
| *G06Q 20/20* | (2012.01) |
| *G06Q 20/32* | (2012.01) |
| *G06Q 20/34* | (2012.01) |
| *G06Q 20/40* | (2012.01) |
| *H04W 4/00* | (2018.01) |
| *H04W 12/06* | (2009.01) |
| *G06Q 30/02* | (2012.01) |

(52) U.S. Cl.
CPC ..... *G06Q 30/0238* (2013.01); *H04L 63/0861* (2013.01); *H04W 4/008* (2013.01); *H04W 4/80* (2018.02); *H04W 12/06* (2013.01)

(56) References Cited

U.S. PATENT DOCUMENTS

2014/0245431 A1    8/2014  Barkai
2015/0347869 A1*  12/2015  Leddy ................... G06F 21/36
                                                                382/115

OTHER PUBLICATIONS

Susan Wiedenbeck, Jim Waters, Jean-Camille Birget, Alex Brodskiy, Nasir Merron, "PassPoints: Design and longitudinal evaluation of a graphical password system", International Journal of Human-Computer Studies, vol. 63, Issues 1-2, (Year: 2005).*

Chiasson S., van Oorschot P.C., Biddle R. (2007) Graphical Password Authentication Using Cued Click Points. In: Biskup J., López J. (eds) Computer Security—ESORICS 2007. ESORICS 2007. Lecture Notes in Computer Science, vol. 4734. Springer, Berlin, Heidelberg (Year: 2007).*

* cited by examiner

User Setup screen

User Setup screen

User Setup screen

User Setup screen

AUTHENTICATION BASED ON VISUAL MEMORY

BRIEF DESCRIPTION

Authentication methods need not be text based alone. They could be based on "images, puzzles or even bio-metric data" which only the user is expected to be able to produce. Modern day handheld devices have authentication methods which have some of those properties. Nearly every mobile phone has a lock screen which can only be opened by the user tracing a unique pattern on the screen (puzzle). Many devices even allow unlocking using fingerprints (bio-metrics).

Apart from the non-reliance on text input, another property of the authentication method, is the concept of "authentication on a scale". The idea being that there is no single, universal level of authentication which serves all use cases. There are use cases which might be served by a less or a more rigorous authentication. In simple terms, a system may need to increase or decrease the difficulty of a password based on some condition. A first failed attempt is one example. That initial piece of information (failed authentication) should prompt a system to increase the level of difficulty. It can work in reverse also, where, based on a condition, a system may decide to reduce the difficulty. That will most commonly be done to make the authentication part easier based on some other condition. For example, the system could reduce the difficulty level for a user from a device used very frequently by the user. This property of an authentication method (Authentication on a scale) is not available in current systems.

Apart from these two properties (non text based, authentication on a scale) there is another property of an authentication method which could be very useful if it can be achieved easily. That property is the "variance of the proof of knowledge". In simple terms, we want our password to randomly change from one session to the next. This does not refer to the user using different passwords for different information systems. It will be useful if user John can somehow authenticate himself to the same website using different password every time he seeks to access it. There are obvious security benefits of this property. This property makes passwords very resistant to hacking attempts. This property is achieved today by use of onetime passwords (OTP) which are delivered "out of band" to the user before use. In these instances, when the user John wants to access a website, the website sends him a unique one time text password on his mobile phone or email. John uses that unique password to access the website.

As can be noticed that while some properties (non text based, variance of proof of knowledge) are available today, they are mutually exclusive. As an example, one time passwords are text based, not visual, and they have to be shared with the user before user can use them. The second property (authentication on a scale) does not even exist in authentication systems today.

"Variance of proof of knowledge" and "Authentication on a scale" are independent properties. Authentication on a scale broadly relates to the difficulty of a password. Can a system require a more difficult or an easier password depending upon some condition? Variance of proof of knowledge relates to the changing of a password given a constant level of difficulty. In simple words, a system can ask for a 5 letter password now and a different 5 letter password next time. In this example, the difficulty of the password is the same, password itself is different.

In this specification, I describe a system based on images, which has all the three properties described above. These properties are
Visual (no text input involved)
Authentication on a scale
Variance of the proof of knowledge
Visual Memory
Here is the Wikipedia's description of visual memory as on May 12, 2016:
Visual memory describes the relationship between perceptual processing and the encoding, storage and retrieval of the resulting neural representations. Visual memory occurs over a broad time range spanning from eye movements to years in order to visually navigate to a previously visited location.[1] Visual memory is a form of memory which preserves some characteristics of our senses pertaining to visual experience. We are able to place in memory visual information which resembles objects, places, animals or people in a mental image. The experience of visual memory is also referred to as the mind's eye through which we can retrieve from our memory a mental image of original objects, places, animals or people.[1] Visual memory is one of several cognitive systems, which are all interconnected parts that combine to form the human memory.
Authentication Based on Images
The system depends on the fact that we are good at storing visual bits of information in our memory and recall it with great precision in random order. The system makes the user remember a set of images (FIG. 1) along with a secret part on each image, which only the user knows. At the time of authentication, a subset of those images (FIG. 3) is presented to the user and the user is asked to point to the secret part associated with each image. Every secret part on the image corresponds to a unique value (FIG. 2). Each set of images (same number of images in same order) corresponds to another unique value, which is derived by combining the individual unique values of the parts selected by the user. This combined unique value acts as the password for the user for one session. Before presenting any set of images to the user, the system knows the value the user is supposed to generate based on that set. If the user is able to point to the correct part on each image, the correct combined unique value is generated and the system authenticates the user. The system is designed so that the likelihood of the exact same set of images (same set of images in the same order) being presented to the user in two subsequent authentication attempts is very low.
The system can be designed to operate on any number of images containing any number of segments. In Table 1, I have presented the example of the system with 10 images per user and each image having 10 segments each. The figures, on the other hand, refer to images containing 9 segments per image. These details are only for illustrative purposes. Usability and security of the system are the only criteria to decide on these parameters. It may not be practical for example, to create a system which asks the user to remember 100 images with 100 segments on each image. The usability of the system goes down as we go higher on the number of images and/or segments even as the security of the system increases. Similarly it is easy to see that a system with 4 images with 4 segments each is also not desirable, as that will be a very insecure system. There is 1 in 256 chance of someone randomly picking the right combination in that system. That said, here are the possible number of permutations of images the system can generate based on a set of 10 images with 10 segments each.

TABLE 1

| Images drawn | Total sets possible |
| --- | --- |
| 1 | 10 |
| 2 | 90 |
| 3 | 720 |
| 4 | 5,040 |
| 5 | 31,300 |
| 6 | 151,200 |
| 7 | 604,800 |
| 8 | 1,814,400 |
| 9 | 3,628,800 |
| 10 | 3,628,800 |

The above calculation assumes that each image has been divided into 10 different segments and user selects a different segment on each image. Meaning, that if the user has selected segment number 1 on image 1, he will not select segment corresponding to 1 on any other image (FIG. 4g). With that assumption, the system can present the user with 5040 different sets containing four images, which will result in 5040 different four digit passwords (e.g. 1234, 2134, 4687 etc).

Apart from the constantly changing password, there are other advantages of this system.

One advantage is that the system can increase and decrease the difficulty (length) of a password (authentication on a scale) depending upon its supposed usage. For simple authentication purposes not involving monetary impact, the system could present a set of 3 or even 2 images. For transactions involving progressively larger sums, the password length could increase (say 4 for transactions below $100, 5 for $100-$1000, and 6 for transactions involving higher sums). There may be use cases which might involve 8 or even 9 size sets. Changing the image sets or committing a different segment on an existing image could be one such use case. That activity is similar to changing one's password in current text based passwords. Use Cases involving impact to lives of people could be another example which would require a larger image set.

Second advantage is that since this system does not have a single secret like a password, it is very difficult to share the password with someone else. Try to imagine telling someone that in the image with 10 skyscrapers, the segment you have selected is the $3^{rd}$ building from left, and in the image with . . . so on.

Third advantage of this image based password system is that even though they work effectively as one time passwords, they need not be shared with the user before use. Notice, that traditional text based one time passwords need to be shared through email or phone before they can be used. Not so in the new system. All the information needed by the user to produce the supposed one time password is already stored in user's visual memory.

A fourth advantage of the system is that since it is visual in nature, this system frees the user from providing a text input to the authentication challenge. The user of this system just clicks or touches the image segment. It is also possible to allow the user to select the image segment just by pointing to the segment or even viewing the segment for a longer duration. Motion tracking and Eye tracking systems are available today which can triangulate a pointer or eye ball position with acceptable precision. This "selecting by gesture" type of input method may be very useful in situations where the device which the user seeks to access is not physically close to the user. In such a case, the device may be equipped with appropriate motion tracking system to allow such input.

BACKGROUND AND FIELD OF INVENTION

There are many environments containing multiple networked devices involving users authenticating to real world devices such as POS, ATM, Locks etc. Authentication system envisioned for those type of interactions needs to be visual in nature and should allow the password's difficulty to be modified dynamically. These features are useful in a standalone authentication system also.

The current invention relates to an authentication mechanism that is well suited to devices equipped with graphical user interfaces. The system does not rely on a text input from a user and by its design challenges the user to provide proof of knowledge which keeps changing from one attempt to the next. The system also allows increasing or decreasing the difficulty of the proof of knowledge based on various conditions.

DESCRIPTION OF THE PREFERRED EMBODIMENT

The preferred embodiment is the system as displayed in FIG. 1-6.

NewAuth

The image based authentication system (called NewAuth henceforth) is an authentication system which challenges a user identified by a unique id to provide a solution to a challenge. The challenge is in the form of an image set, where a set of images already known to the user are presented to the user in a sequence and the user is expected to select the secret segments associated with each image. These secret segments are already registered with the system. This system has some unique features which are not available in traditional authentication systems based on userId/password. These features are possible because of the 3 properties this system has by design. These three properties are Visual (no text input involved)

Authentication on a scale

Variance of the proof of knowledge

An example will illustrate how these properties contribute to new features of newAuth.

A traditional authentication system has two components. A public component (userID) and a private component (password). In the traditional system, the private component is static (the password is just one string value). In newAuth, the password is dynamic and the system is free to choose however long a password it wants to challenge the user with. This property (Authentication on a scale) can be used to provide a feature not available in a traditional authentication system. The newAuth system can store a third key on a device one user frequently accesses the system from and based on the availability of the third key on that device, reduce the length of the password.

Lets say user John has a computer at home and he accesses newAuth from that machine regularly. NewAuth system, might start with a password length of 4 or 5 for example. But, after detecting the regular pattern, could store a unique ID on John's home computer. The next time John accesses newAuth from his home computer, newAuth could detect the stored uniqueID and present John with 3 or even 2 sized password (click on 3 or 2 images).

Reverse is also true. Upon detecting that a particular device is used by multiple different people, the system could increase the complexity (length) of passwords from that device.

Variance of the proof of knowledge refers to the property of the system which allows different image sets of same size to be returned at different times.

Implementing the system

SYSTEM

The newAuth system is implemented as a web based system (FIG. 7 NewAuth). It is also possible to create a newAuth type system and install it on each individual machine.

When implemented as a separate system (web based or otherwise), NewAuth allows the users of multiple different systems to authenticate to the respective systems. Lets take an example of an arbitrary website X. If website X needs to use newAuth to authenticate its users, IDs of X users will need to be mapped to their newAuth IDs. When a particular user seeks access to website X, website X will pass the user's ID on X website to newAuth. NewAuth system will lookup the internal newAuth ID of the user and send the challenge images registered with that internal newAuth ID. After successful authentication, a success return code will be returned to website X, which will then allow user access. Notice that in this scenario, user never entered their individual password for X on the X website.

NewAuth has two components (FIG. 8)
  Server System
  Client System
NewAuth server system has 4 main components (FIG. 10)
IO subsystem
  IO subsystem is the component which accepts requests from user systems and responds to them.
Context Engine
  Context engine is the component that assigns the risk rating to a request. This component determines how difficult an image set to send as a response to a user authentication request. The context engine has two broad parameters to control in order to set the difficulty of an authentication challenge. First is the size of image set and the second is the time allowed to complete the challenge. Some conditions the context engine evaluates before deciding on the difficulty of a challenge are the purpose, monetary impact of request, the device profile of the request origin and user's historical performance with earlier authentication attempts.

Entropy subsystem
  Entropy subsystem is the component that is responsible for selecting a random image set from the data store. This random image set needs to meet the difficulty or length requirements defined by the context engine.
Data Layer
  Data layer holds the data (image sets and random hashes of all the image combinations) for all users.
NewAuth client system has 2 main components (FIG. 9)
IO subsystem
  IO subsystem is the user facing part of newAuth client. It is responsible for rendering the image sets provided by NewAuth server in the most efficient manner possible to the user and accept the user's input. IO subsystem also tracks the time taken to respond to the challenge.
Network interface
  Network interface accepts the data provided by IO subsystem, processes it and sends it to the newAuth Server. Network interface also accepts the response from the newauth server and passes it to the IO subsystem.

DATA

Implementing a system described above is not the same as implementing a system based on text passwords. Text passwords are usually saved as hashes in a database. Storing hashes of all possible passwords for all the users will result in huge demands on the storage. For example, assuming the system containing 9 images with the user selecting the following segments on those 9 images.

TABLE 2

| Image | Selected Segment |
|---|---|
| 1 | 2 |
| 2 | 5 |
| 3 | 6 |
| 4 | 8 |
| 5 | 1 |
| 6 | 7 |
| 7 | 4 |
| 8 | 9 |
| 9 | 3 |

Based on this core data, we can come up with nearly one million (986,409) different permutations of images and corresponding segment values. Every permutation of segment values could be used as a password. We can take each permutation of images and find the selected segment values corresponding to that permutation. The size of each image set will roughly correspond to the difficulty level of the password. The raw selected segment values (gray column in Table 3) need not be stored because exposure of those values will compromise the whole user profile. Here is what a small portion of the data in that database will look like.

TABLE 3

| Image Set | Difficulty | Selected Segments | SHA384 hash of selected segments |
|---|---|---|---|
| 147 | 31 | 284 | 4fd6c0488dd5bdc84309441 6c29e8e890279d5a559f9bf3 036d6d58c65e932ce23307a 665927f0f305eb4a6eaced2ebf |
| 239 | 34 | 563 | 8f86d2c63a524e9ec379f942 c41f11f707068f6db8e08b7d e0e804481cbbd90dd90788a 51d6e13c4aaa7169a50f5f6a1 |
| 3278 | 42 | 6549 | f6c55e918a2e9ca77ff85aed4 cf55a170ea2af77be3ef9b4a7 306d9251d1acb9ac14fab911 18ad2a2643b5450f129b58 |
| 76591 | 53 | 47132 | 7bd7e8aff8b7cfa728d0f901 d3a9052388f08d870ca621cc d0e14a00b51838ccb51efa98 6cf8e4048614cd275e9e698c |
| 76592 | 52 | 47135 | 567533e47d62abfc8d6d7e5f dc41dfcbc9de3239481e0395 7e9592e2bcad7e5b1f7ee166 f0c508d149aef04d25cb197c |
| 67591 | 52 | 74132 | 023907dabacd47a154c31b4 39ed3c83256fbb80ef655e07 3bc7703eec13998f972fa307 b50d672387e63cfffdee848b1 |

Table 3 lists 6 potential rows in the database, out of nearly a million possible ones. The second column "Difficulty" of an image set is a numeric value. The database keeps updating the values of difficulty based on real time data about user's performance during authentication challenges. Database analyzes device information, transaction information, image set information and user's performance (time taken, status of authentication attempt) to adjust the difficulty level of image sets. Difficulty value is used by the system to select an image set for a given authentication attempt at a given difficulty level.

Assuming that in Table 3, one password record is 100 bytes, this will result in a database size of nearly 100 MB (1,000,000×100 B). Notice that, this is just one user's data based on 9 distinct images. The size of the database will exponentially increase as the number of images and users increases.

One way to solve the size of database problem is to not store every possible permutation in the database. We can just store a subset (say, a few thousand randomly selected permutations) and their resultant password hashes. That will drastically bring the size of the database down. Taking the same example as above, assuming that we save 2000 different permutations for set sizes 4-9, that will come to about 1.4 MB (2000×7×100 B) of data per user. While not small, it can be managed with the techniques available today.

Another way to solve the database size problem is to just store the user's individually selected segments against each image and compare the user's input directly against stored data. For the example shown in Table 2, the system will store data very similar to Table 2, Assuming that during an authentication session, the image set shown to the user was images 4,7 and 8, the system makes sure that the selected segments returned by the user correspond to values 8-4-9. This brings down the database size drastically but risks making user data vulnerable to possible hacks. Those risk concerns can be addressed by implementing suitable encryption strategies for stored data.

Sample Data Flow in the System for Some Usage Scenarios

Scenario 1—A POS Detects a User's Personal Device in range and the POS Selects this User's ID for Transaction 1. The user's ID is detected/read by the IO subsystem of the newAuth client running on the POS.
2. The user's ID is passed to network interface of the newAuth client.
3. Network interface passes the user's ID along with transaction and device identifying information (like merchant name, location, time, transaction amount etc) to the newAuth's server system.
4. On the server side, this information is received by the server's IO subsystem.
5. Server's IO subsystem passes this information to the Context engine. Context engine analyzes the information and based on the information determines which newAuth user needs to be authenticated and how difficult the authentication challenge needs to be.
6. Context engine passes this information to the entropy subsystem.
7. Entropy subsystem queries the data layer for a random image set meeting the criteria (user and difficulty) defined by Context engine.
8. Data layer returns the image set and the corresponding hash value to Entropy subsystem.
9. Entropy subsystem passes the data to Context engine. Context engine retains the hash value corresponding to the image set and returns the image set to IO subsystem.
10. Server IO subsystem sends the image set to the newAuth client's network interface, on the POS. Server's IO subsystem can optionally send this image set to the user's personal device also.
11. Client's network interface passes this image set to the client's IO subsystem.
12. Client's IO subsystem displays the image set and accepts user's input.
13. After user selects the secret part on each image in the image set, the resultant hash is sent to the client's network interface.
14. Client's network interface sends the hash to newAuth server.
15. Server's IO subsystem receives the hash and passes it to the context engine.
16. Context engine compares this hash with the hash provided by the data layer in step 9.
17. If the hashes match, the authentication is successful.
18. If the hashes do not match, then steps 5-16 are repeated according to the user's profile and other risk conditions. The system may send more image sets to authenticate the user, The system could increase the difficulty of the challenge. The system could terminate the user's session. All these options can be evaluated based on the transaction, merchant and user's profile details.

Scenario 2—A User Enters his ID Manually into a Device
1. The user's ID is read by the newAuth client's IO subsystem.
2. The user's ID is passed to network interface of the newAuth client.

3. Network interface passes the user's ID along with transaction and device identifying information (like device name, time, device usage details etc) to the newAuth's server system.
4. On the server side, this information is received by the server's IO subsystem.
5. Server's IO subsystem passes this information to the Context engine. Context engine analyzes the information and based on the information determines which newAuth user needs to be authenticated and how difficult the authentication challenge needs to be.
6. Context engine passes this information to the entropy subsystem.
7. Entropy subsystem queries the data layer for a random image set meeting the criteria (user and difficulty) defined by Context engine.
8. Data layer returns the image set and the corresponding password's hash value to Entropy subsystem.
9. Entropy subsystem passes the data to Context engine. Context engine retains the hash value corresponding to the image set and returns the image set to server IO subsystem.
10. Server IO subsystem sends the image set to the newAuth client' network interface.
11. Client's network interface passes this image set to the client's IO subsystem.
12. NewAuth client's IO subsystem displays the image set and accepts user's input.
13. After user selects the secret parts on each image in the image set, the resultant hash is sent to the client's network interface.
14. Client's network interface sends the hash to newAuth server.
15. Server's IO subsystem receives the hash and passes it to the context engine.
16. Context engine compares this hash with the hash provided by the data layer in step 9.
17. If the hashes match, the authentication is successful.
18. If the hashes do not match, then steps 5-16 are repeated according to the user's profile and other risk conditions. The system may send more image sets to authenticate the user, The system could increase the difficulty of the challenge. The system could terminate the user's session. All these options can be evaluated based on the user and client's (device's) profile details.

DESCRIPTION OF FEW OTHER EMBODIMENT

Images containing large number of segments
  In the exemplary embodiment, we have discussed images divided in a small number of segments (say 6-10). In that embodiment, the user is asked to remember a relatively large number of images (say 10-20). It is also possible to keep the overall number of images small by increasing the number of segments per image. If we divide one large image in 10,000 segments (a 100×100 grid), it is possible to authenticate a person by presenting them only 2 or 3 images. Only 2 images generate 100,000,000 (100 million) possibilities. Since the total number of permutations of images is low in this embodiment, this embodiment solves the size of the database problem (pages 14-16) identified with the exemplary embodiment.
  While this embodiment is secure and needs a smaller sized database, there may be some limitations because of the large number of segments on a image. Small screen devices such as smart phones may not be able to correctly detect the user's selection and be limiting in terms of usage.
  This embodiment could be used as a backup authentication mechanism which could be made available only on large display devices. For example, it is possible that the NewAuth system makes the user remember a few of these large images as a backup. If the user finds himself locked out after a few failed authentication attempts, he could authenticate himself by this mean and update his remaining images. This feature could only be made available on a person's personal computer equipped with a large display. This in a way becomes the "Forgot my password" mechanism of NewAuth.
Very high resolution images
  In this embodiment (FIGS. 11a and 11b), a very high resolution image is used to generate the passwords. The user is able to enlarge a segment of the image by clicking on that segment and keeps on selecting a subsequent segment on every enlarged image. This is similar to the zoom feature available on most mapping applications. In this embodiment, every image is divided into segments identified by unique values and the aggregation of all the segments selected by the user becomes the password. In this embodiment, the server decides to what degree the user needs to keep drilling down in order to authenticate.
  The main difference between this embodiment and the exemplary embodiment is that in this embodiment, server can not present the user with any arbitrary sequence of images, because each subsequent image follows logically from the previous one. Each image is a zoomed-in version of the segment selected on previous image. The only variation left to the server is how many images the server keeps sending to the user. For example, the server could determine that in a given situation, a 3 level deep authentication is enough. Then the server sends the main image (FIG. 11a.i), the user selects a segment on that image (level 1), the server sends the enlarged portion of that segment (FIG. 11a.ii), then the user selects another segment on that image (level 2), the server sends the enlarged portion of that segment (FIG. 11b.i), then the user selects a segment on the last image (level 3). Assuming that the user selected all three segments correctly, the server could stop sending further enlargements (do not display the image in FIG. 11b.ii) and approve the authentication.
Images with distinct points indicated
  In this embodiment, instead of the image being divided into different segments, the image displays dots at different places. All these dots have a unique value associated with them. The user selects a different dot on each image and thereby generating a unique password based on a set of images. In this embodiment, instead of a static grid, the user could be shown particular interesting features on a picture and he could click on one feature. This aids in easier recall of the individual unique value associated with each image. It could be a little easier for a user to recall a particular point feature on an image, rather than a segment.
Images with arbitrary sized grids indicated
  In this embodiment, instead of the image being divided into different rectangular, square or any other geometric shape, the image is divided in grids of arbitrary shapes. All the grids have a unique value associated with them. The user selects a different grid on each image and thereby generating a unique password based on a set of images. This embodiment is similar to the exemplary embodiment except for the shapes and sizes of the segments. In the exemplary embodiment, since the shape of the grid is symmetric, that grid is easier to construct on the client UI. In this embodiment, the server will need to store the layout of the grid applicable to an image and send that layout to any client that needs to interact with the system.

Start with a known phrase and associate with images

In this embodiment, instead of starting the setup process with a set of images, the system starts with a phrase or some other value (numeric or otherwise) which the user can recall with ease. Then, the phrase is divided in its constituent parts (a word is broken into letters etc). Then the user is shown images which are divided in individual segments with one segment corresponding to each letter highlighted. The user selects images which he can remember easily along with the segments. At this point, the system is identical to the system described in the exemplary embodiment. During authentication time, the system can display any random set of images and the user can point to the previously remembered segments on each of the images just as in the exemplary embodiment.

DESCRIPTION OF PRIOR ART

In U.S. Pat. No. 8,117,458, Osborne III et al describe an authentication system which could be deemed the closest to the present invention. The main thrust of that invention is having the user select an image category during setup time. During the time of authentication, the user identifies the images which belong to the user's selected category. After identifying the images, the user enters random alphanumeric characters appearing on the identified images in an input field and sends them to the server for validation. For example, a user may select "automobile" as a category. During the authentication time, server will send a set of images, some of which will be automobiles. All the displayed images will also display some random text superimposed on them. The user will enter the random texts appearing on automobile images in a text box and submit these to the server. Since the server already knows which images were automobiles and also what random texts were superimposed on those images, it can compare the user's response and respond accordingly.

As we compare that invention with the current one, we can readily see the outward differences. For example, the user experience. In Osborne, the user needs to spend some cognitive effort in identifying the automobiles in a set of random images and then physical effort typing the random text appearing on those automobile images. Present invention has done away with part of the cognitive effort and most of the physical effort of typing the unique value. The cognitive effort has been reduced to only a recall effort. No effort needs to be expended to classify the image set. All the user of the present invention does is recall what area of the presented images he had selected at the setup time and point to that area again.

These outward differences can also be analyzed based on what these systems do "under the hood". Osborne system is easier to setup, since it only needs to capture a category from the user. Compared to that, the present invention is much more involved at the time of setup. In the present invention, both, the user and the system invest a lot of effort at the setup time. In the present invention, user selects a set of images and commits a part of each image to his memory. Based on that image set information, the system generates all possible permutations and stores them in the database. The system also tests the user with a subset of those permutations during setup time. All this initial effort serves both the user and the system very well at the time of authentication. The process of authentication is much simpler and faster in the present invention. At run time, the present system is only doing a retrieval operation from the database. Compared to that, Osborne process during the authentication time is much more involved. There, the system is generating a random image set, inserting a few images from user's selected category and then adding random texts on all the images. Notice that system does all this for every authentication action. This process is much more computation intensive compared to the present invention. In addition to the computational overhead at run-time, Osborne system is more difficult to use than the present invention. So, Osborne system is difficult to use and needs a lot more run-time resources than the present invention. The one advantage Osborne has over the present invention is that it is easier to setup.

It will be useful to compare the present invention with another prior art. In U.S. Ser. No. 00/913,5416, Barkai et al describe another GUI based authentication system which suffers from some of the same drawbacks (run-time computational cost) as Osborne. In Barkai, the system stores a lot of person details about the user (their relationships, communication behavior etc) and at the time of authentication analyzes all that information and challenges the user with questions that assimilate that information (such as, "connect the names appearing on screen, which are your family members"). It can be seen that in order to come up with that question, the system needs to analyze a lot of information. It is the same drawback which Osborne suffered from. Moreover, Barkai does not have the advantage of easier setup which Osborne had. Here, the user is having to undergo an intensive setup process of providing personal details to the system.

It can be noticed that Barkai, Osborne and present invention, all have attempted to achieve variability of proof of knowledge in a modern UI based computing environment. Osborne ended up with an approach which generates the entropy at run-time while keeping the setup relatively easy. Present invention is the reverse of Osborne from that perspective. Analyzing it only along these axes, both Osborne and present invention are an improvement over Barkai because in Barkai, both setup and run-time are computationally costly. In terms of keeping with the UI theme, Osborne still had its users enter some random texts in an input box. So, from that point of view Barkai and present invention are an improvement over Osborne.

Apart from these systems, the visual password system much in vogue these days is the one available on most smartphone lock-screens. There, the user is supposed to trace a pattern on the lock screen to gain access. That system is easier to setup and use as well. No wonder, it is so common these days. However, it does not offer the variability of proof of knowledge. The system can not have the user trace different patterns at each authentication attempt. The system also can not provide authentication on a scale.

NewAuth system, as presented in this application trades away the setup time ease to achieve the advantages of variability of proof of knowledge and authentication on a scale (modify the difficulty of password based on a condition). As mentioned earlier also, no other system, including the cited prior art, provide all these features.

BRIEF DESCRIPTION OF DRAWINGS

FIG. 4a shows the user a set of images, it also allows user to upload his favorite images. FIG. 4b shows the system recording the user's selected segments on each image. It is these selections which create the unique passwords.

FIG. 4c displays all the images which the user has been shown so far and the user's current selected segments for each of those images. FIG. 4d displays the recall test in progress. The user is shown one image and asked to recall the segment he had selected for that image. At the bottom are two fractional numbers. First fractional number refers to the current recall test. In this image, it signifies that in the current test there will be 1 image and the user has selected 0 segments so far. The second fractional number shows the total number of recall tests the user will need to complete and so far, he has completed 0 out of 10 tests.

FIG. 4e shows the second last test ($9^{th}$ out of a total of 10) of a subset of images. In this subset, 3 random images from the user's selected images are shown to the user and the user is asked to recall his selected segments on each image. FIG. 4f shows the end of the recall test. It informs the user that the setup process is complete. It also displays to the user some statistics about how the user did in the recall test. The newAuth system can use the data generated during the recall test during real authentication. The system could compare the time taken during recall test with the time during real authentication and tweak the difficulty of the challenge. For example, if a user did a test recall in 4 sec and during authentication took 10 sec and even then did not recall the correct segments, the system could increase the challenge difficulty by presenting a larger set for second attempt. Similarly, if the same user takes 2 sec during authentication and does not recall all the images correctly, the system could keep the challenge level same.

The system can also keep track of real time performance of each recall (image set used, time taken and the status of each recall) by the user and use that information in subsequent authentications. For example, if a user is consistently taking a long time to recall some sets, those sets could be retained for backup authentication attempts because these sets are more "difficult" even though these subsets are the same size as other sets. This data becomes a second metric to tailor the difficulty of authentication challenges other than the size of image sets. Also, if the user is consistently taking less time during authentication, the system could reduce the time available to the user during subsequent authentication attempts.

Figure 1:
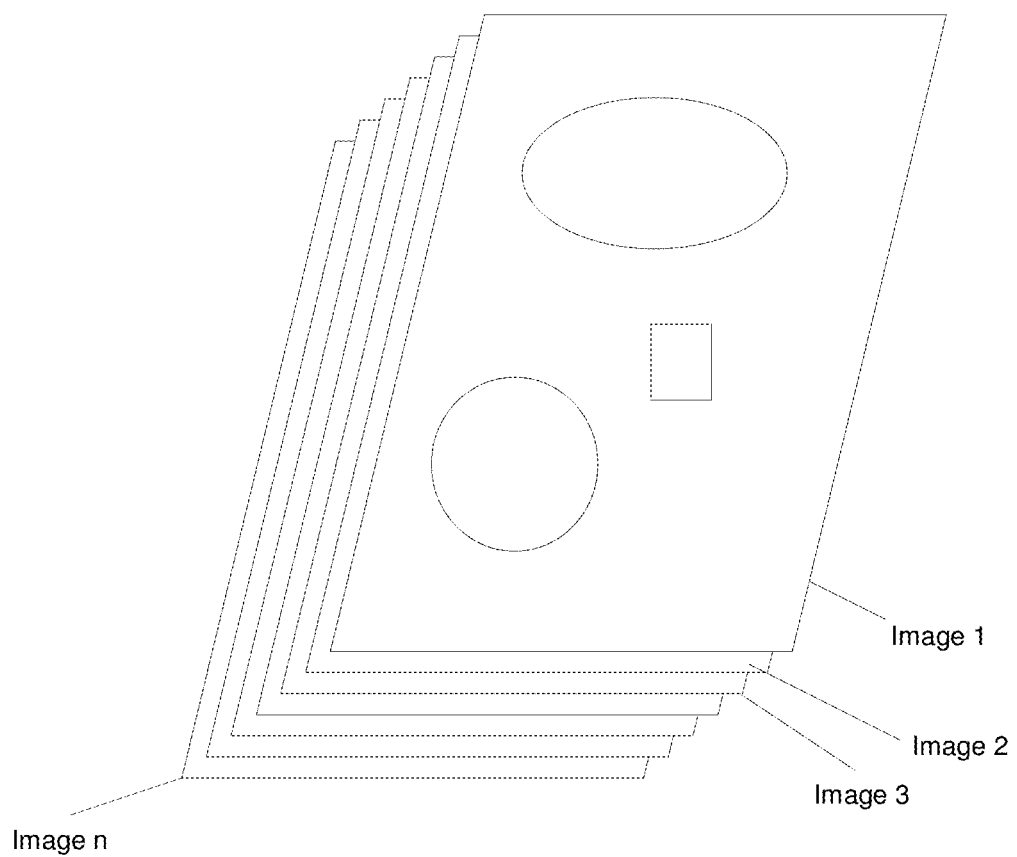
FIG. 1 Displays a set of images. These images can be provided by a user or they can be archived images stored within the newAuth System's archive or a combination of both. The user is familiarized with all these images.
Figure 2:
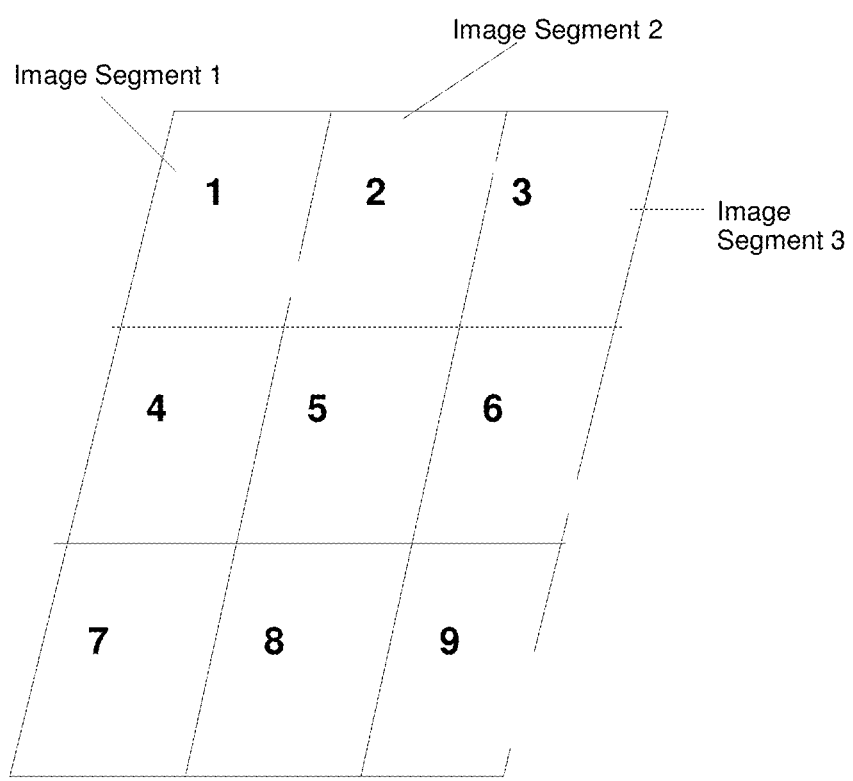
FIG. 2 Each image is divided into segments and each segment is identified by a unique value. The user selects one segment per image and remembers which segment of which image was selected. The choice of how many segments to divide an image in, needs to balance two conflicting requirements. The higher the number of segments, the more secure the system. However, as we increase the number of segments on an image, the user needs to select smaller and smaller area of an image. This reduces the usability of the system. There is a limit to the preciseness with which a user can select an ever smaller segment. Especially on small screens, it may not be feasible to display an image with a large number of segments and identify the user's selected segment accurately.
Figure 3:
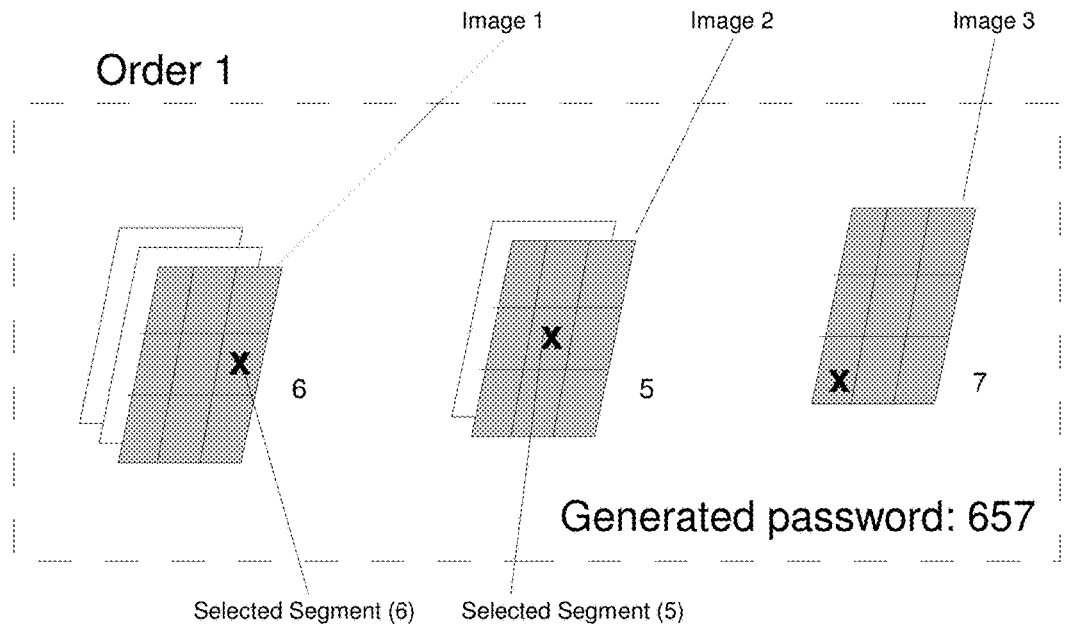
FIG. 3 This figure displays that multiple different passwords could be generated by using same images, just by presenting these images to the user in different order.
Figure 3:
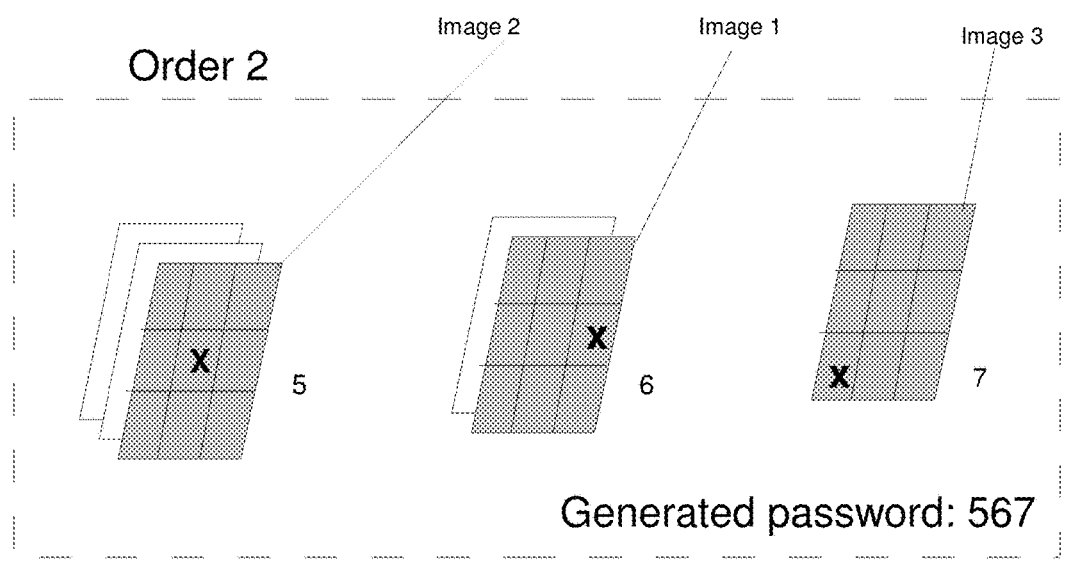
Figure 4A:
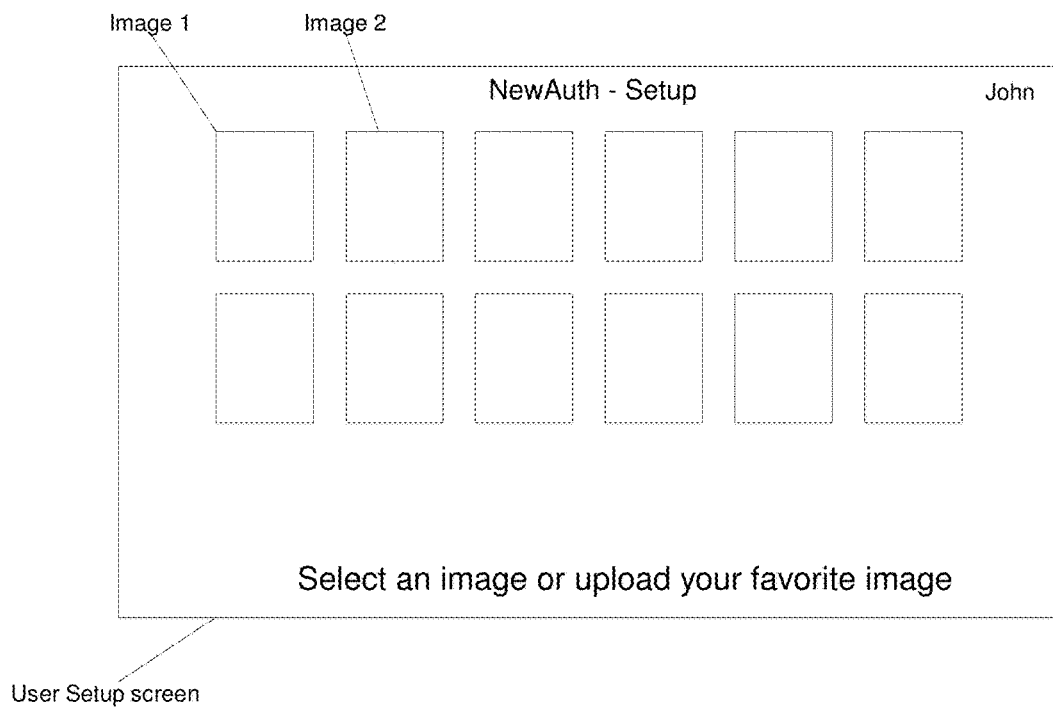
FIGS. 4a and 4b This figure displays a sample flow of the user setup. This is the time when a new user is being setup in the newAuth system.
Figure 4B:
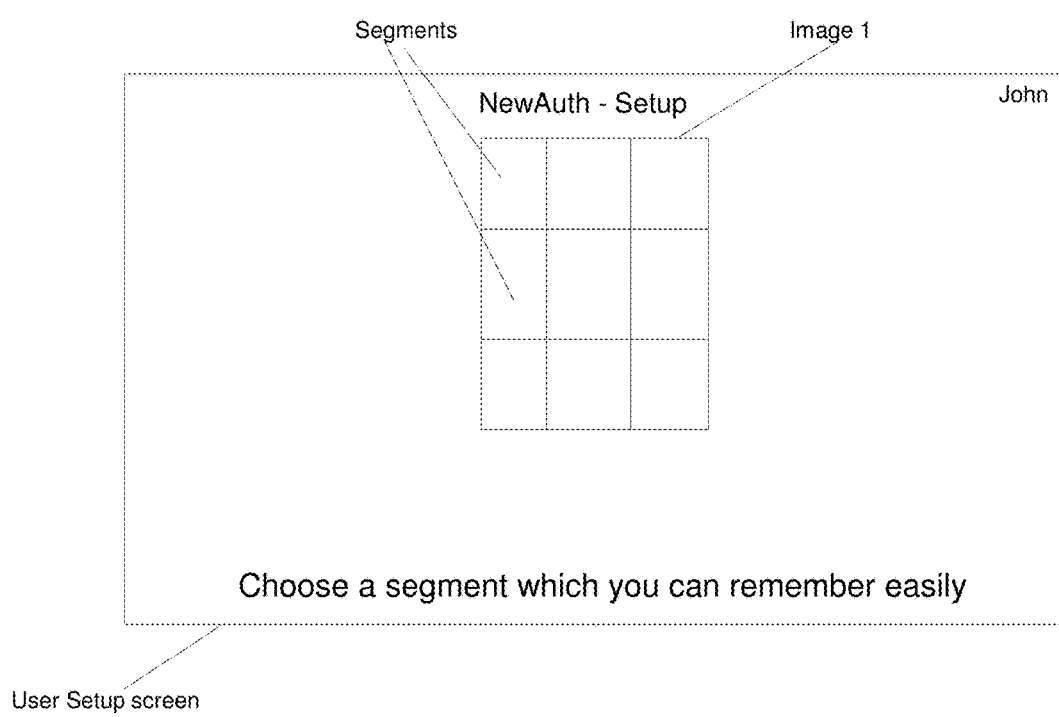
Figure 4C:
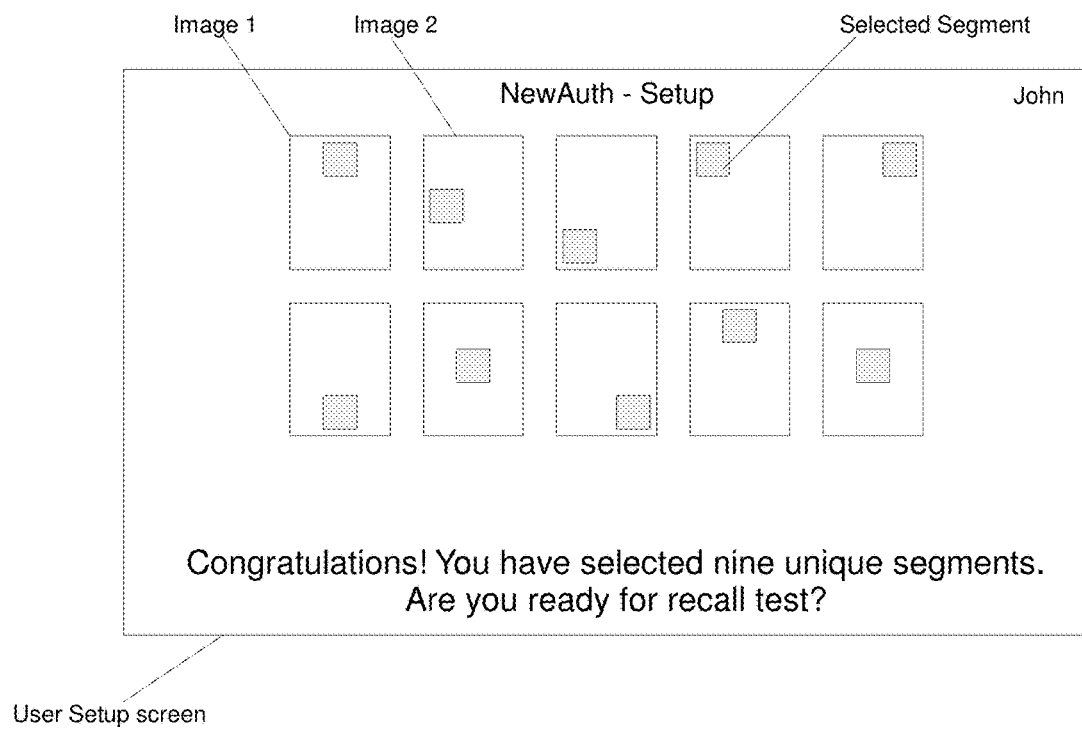
FIGS. 4c and 4d This figure displays continuation of the user setup.
Figure 4D:
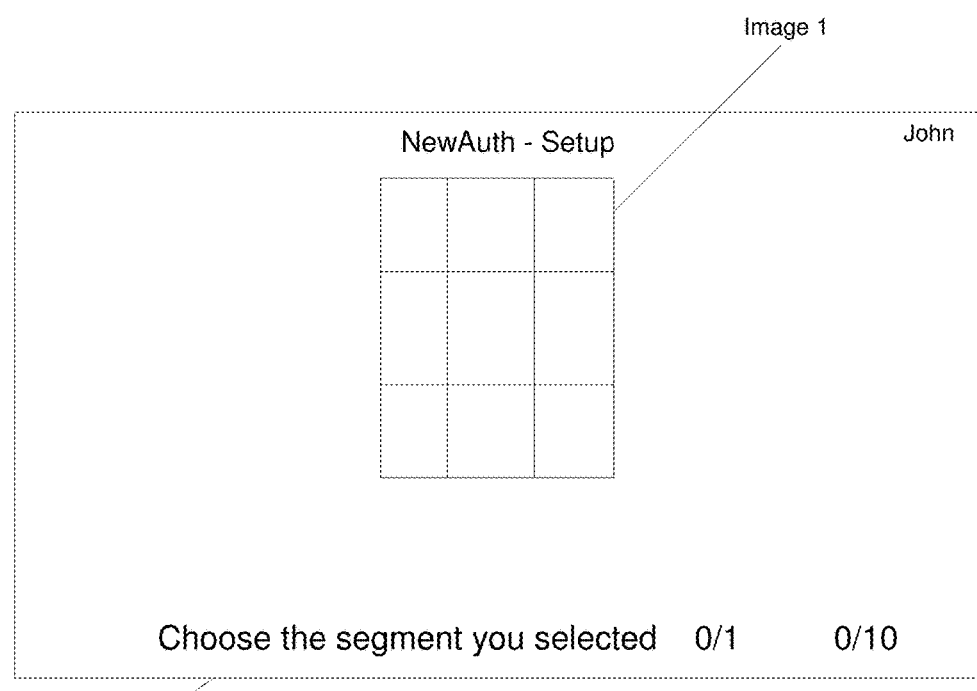
Figure 4E:
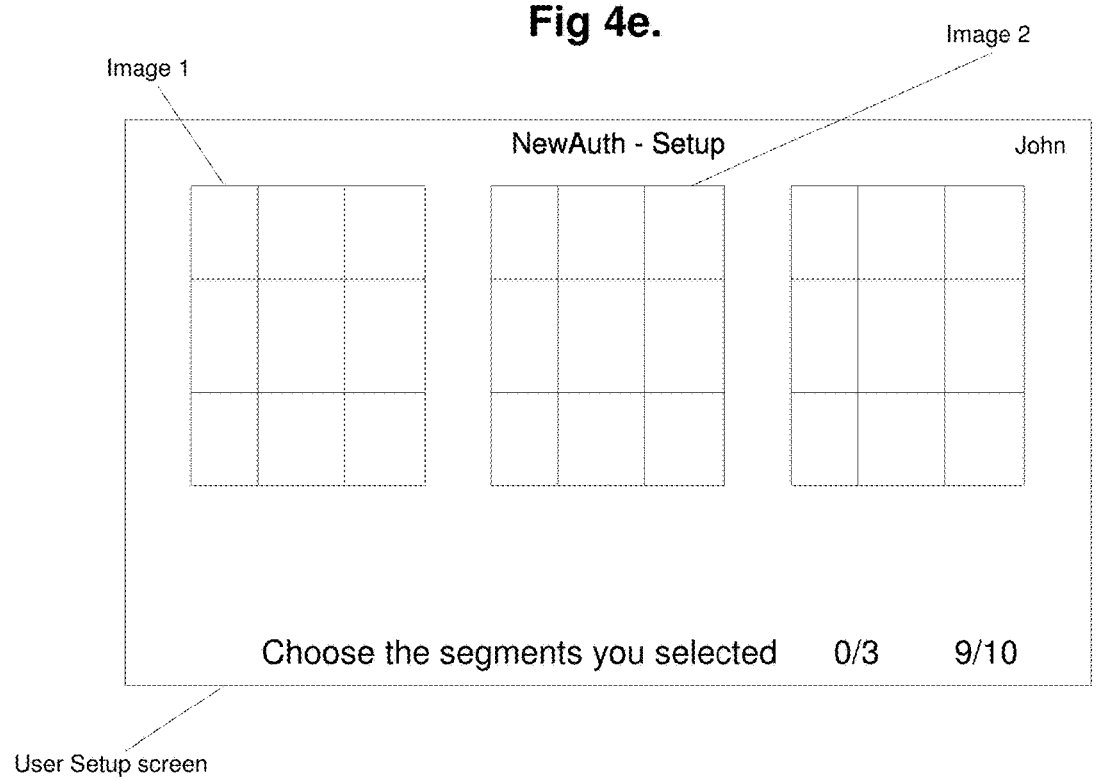
FIGS. 4e and 4f This figure displays the recall test in progress.
Figure 4F:
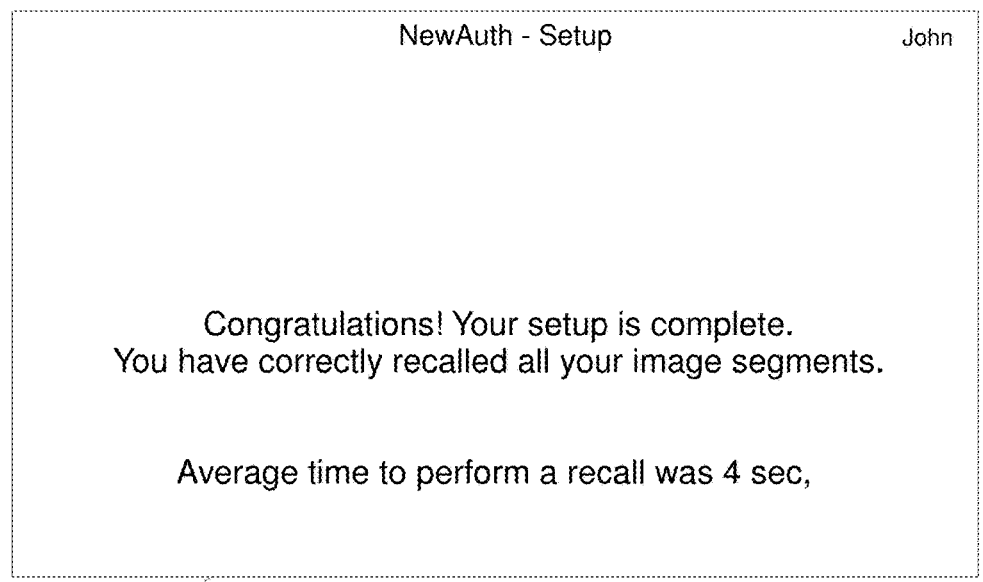
Figure 4G:
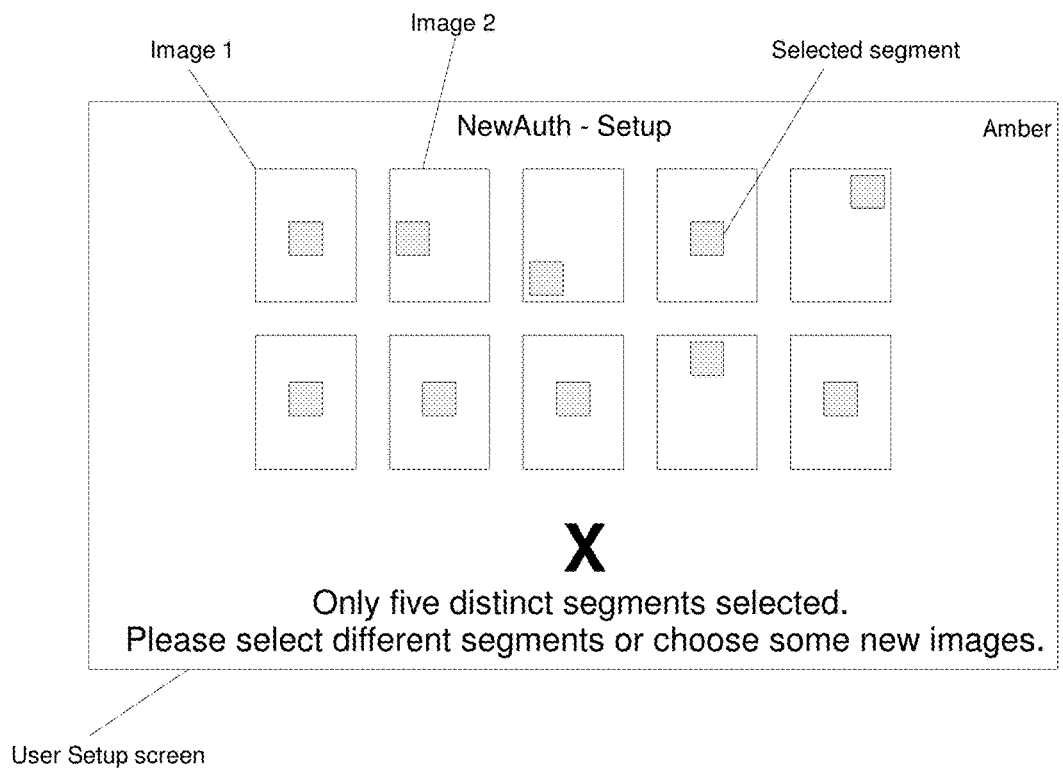

FIG. 4g This figure displays a failed setup. In this setup process, newAuth system did not find enough variation in the segments selected by the user for his entire image set. In this setup, the user selected the same segment on multiple images. This scenario reduces the number of unique passwords that can be generated based on a set of images. NewAuth system avoids this scenario and suggests user to select different segments on the same images or select some different images.

Figure 5A:
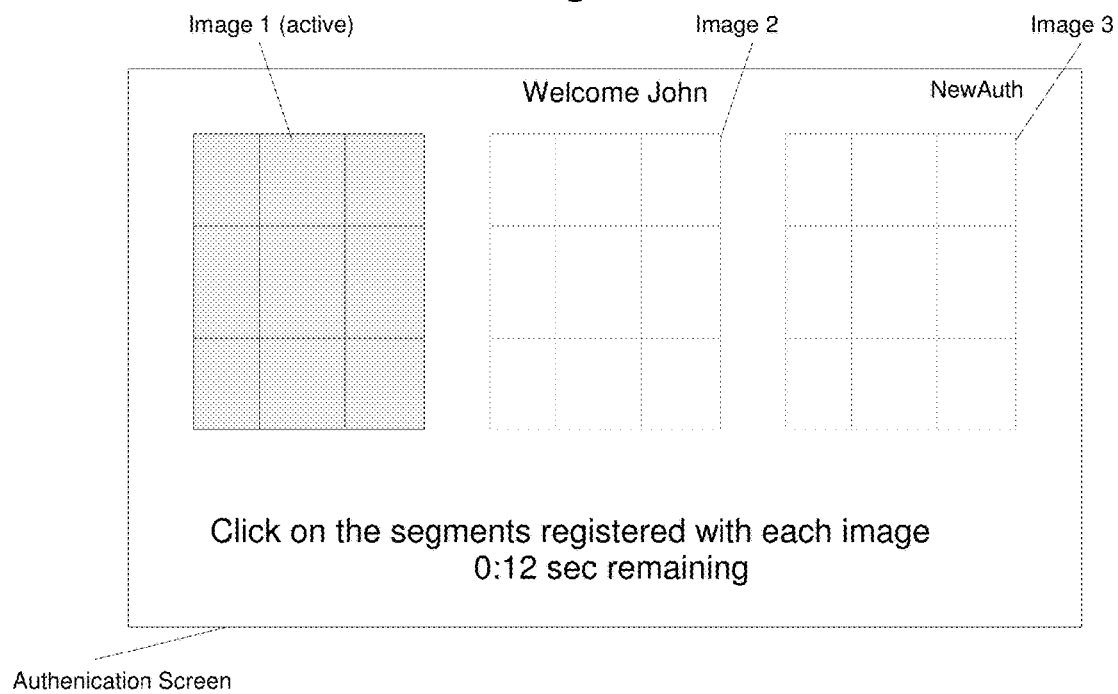
Figure 5B:

FIGS. 5a and 5b This figure displays an authentication performed by the system. FIG. 5a shows a set of 3 images presented to the user. Only the first image is set to accept the user input. It is also possible to display only one image at a time. This is a design decision based on the size of screen which the user is authenticating from. FIG. 5a also shows a clock counting down to 0 sec. This interval is based on the user's previous performance on a similar set. That data could be based on setup time or other previous authentication attempts.

FIG. 5b shows the successful authentication scenario. User John successfully clicked the image segments he had selected during setup time within the time allowed.

Figure 6A:
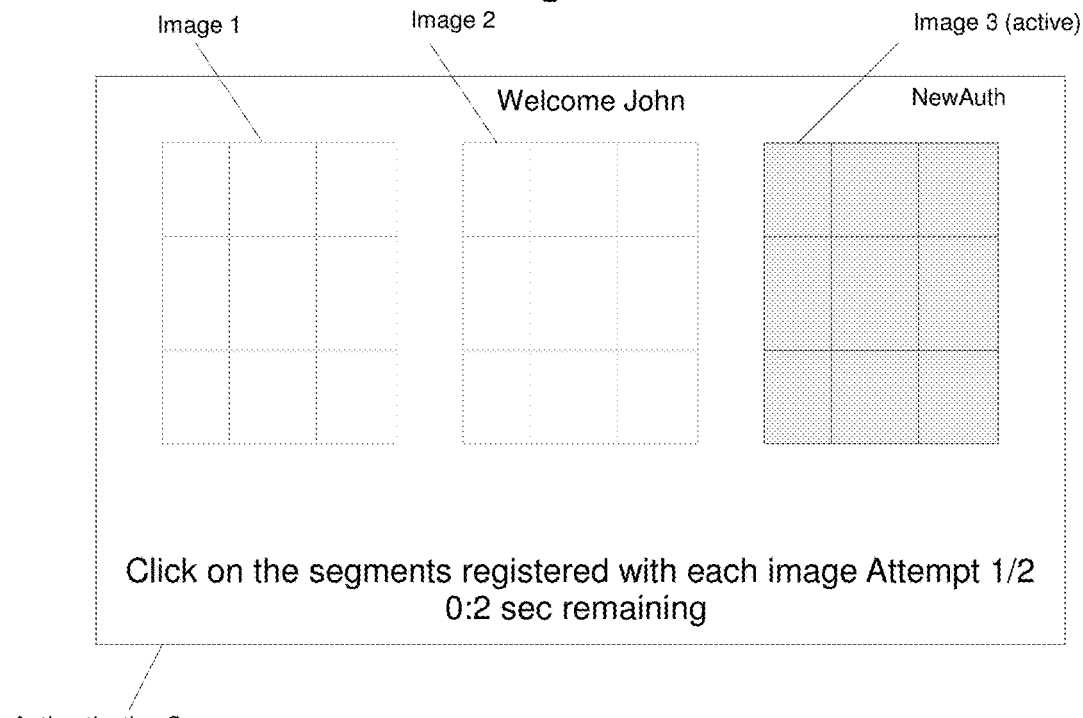
Figure 6B:
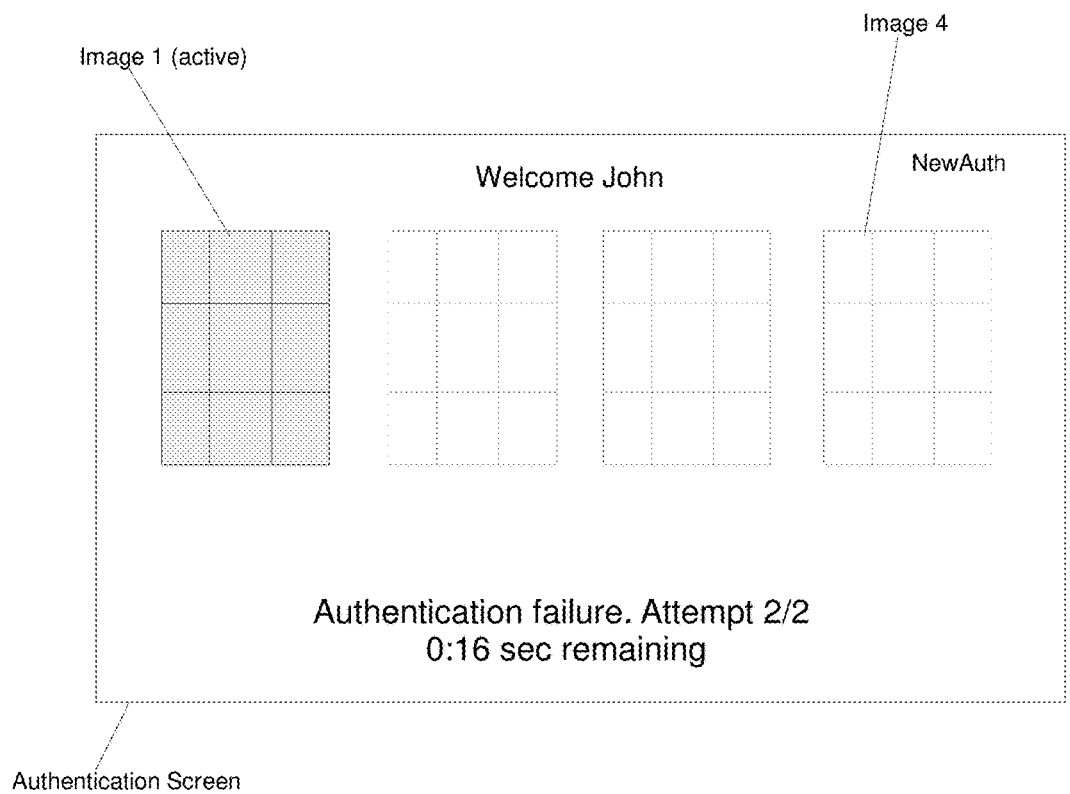

FIGS. 6a and 6b This figure is similar to FIG. 5a, except that it displays an authentication failure scenario. In FIG. 6a, the user still has to click the third and last image. Notice that there are 2 sec remaining. If the user fails to click a segment on the third image or selects a wrong segment on any of the three images, the system counts that as a failed attempt and allows the user one more attempt. In the figure, only 2 attempts at authentication have been suggested. The system can be configured to support any number of authentication attempts.

In FIG. 6b, the system automatically increased the difficulty of the challenge (it increased the image set size from 3 to 4). This feature is not available in any authentication system available today.

Figure 7:
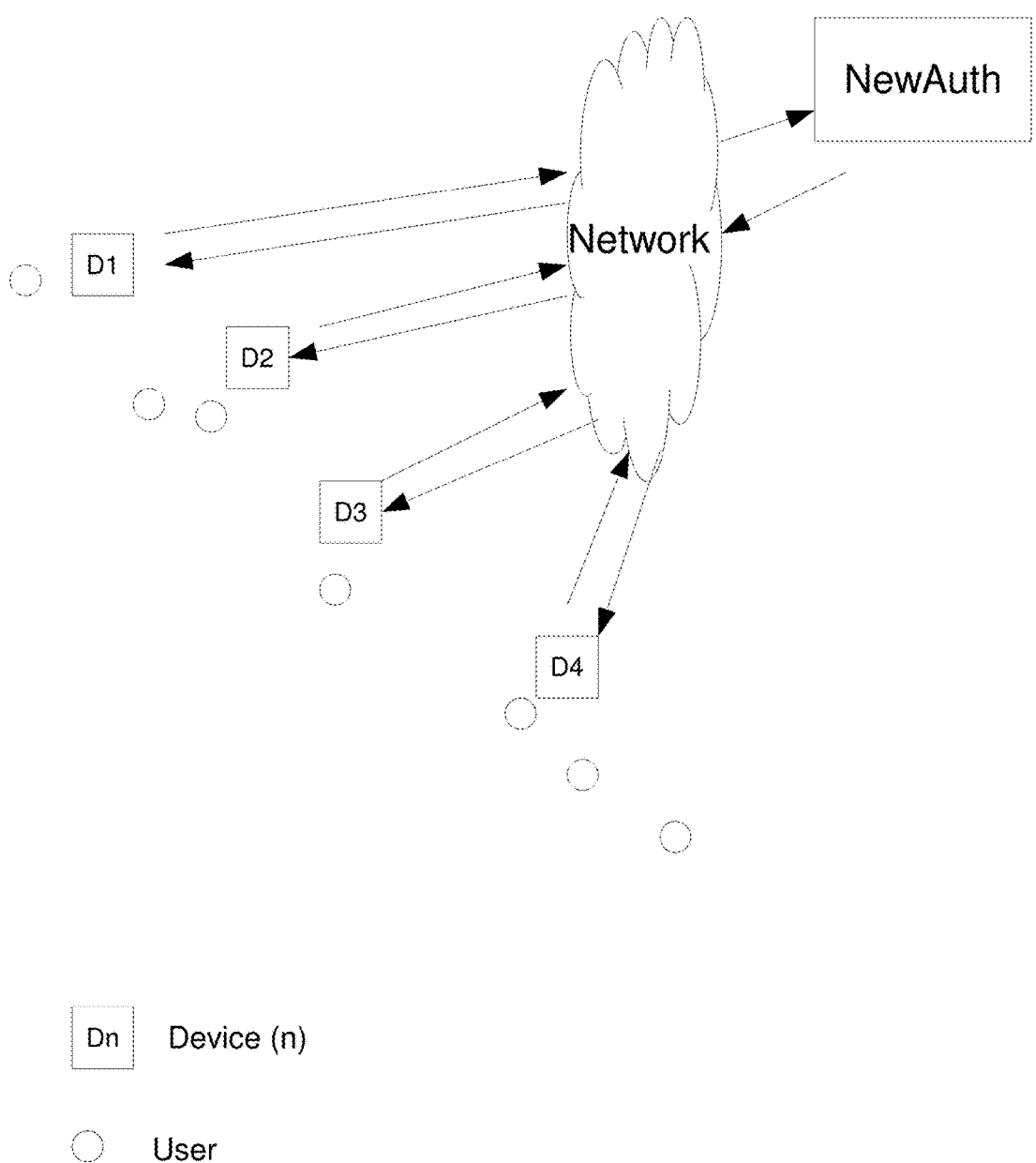

FIG. 7 This figure is a schematic of the overall interaction with newAuth system. Different devices are shown interacting with the newAuth system. These devices interact with the newAuth system within the context of a user request. The user typically accesses these devices and the device needs to be certain that the user seeking access is a valid user of the services provided by the device system. The device detected multiple users by detecting personal devices carried by the users and selected one user to transact through the device. In that scenario, the user's id is automatically detected by the device and the user is only supposed to solve the authentication challenge. Apart from that usage, another usage scenario could be a user manually entering the user id into the device and subsequently solve the authentication challenge to access the device's services.

Figure 8:
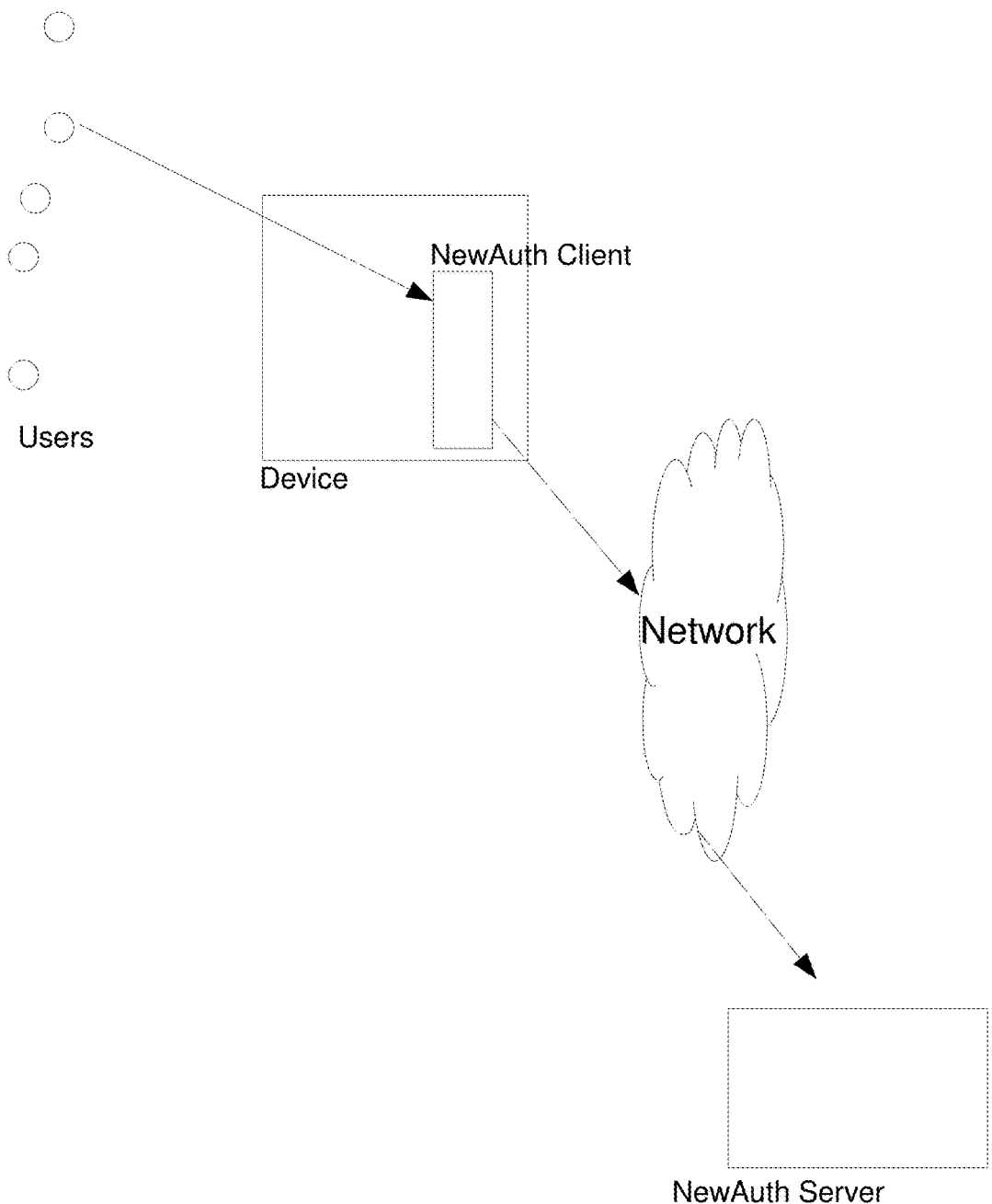

FIG. 8 This figure displays a detail view of newAuth system. It highlights that the newAuth system is composed of two different components. A client component, which is part of the device that needs to be accessed by a user. The server component is the remote part which the client accesses in order to authenticate a user. The typical flow of information within the system is from user to device to newAuth client to newAuth server and back.

Figure 9:
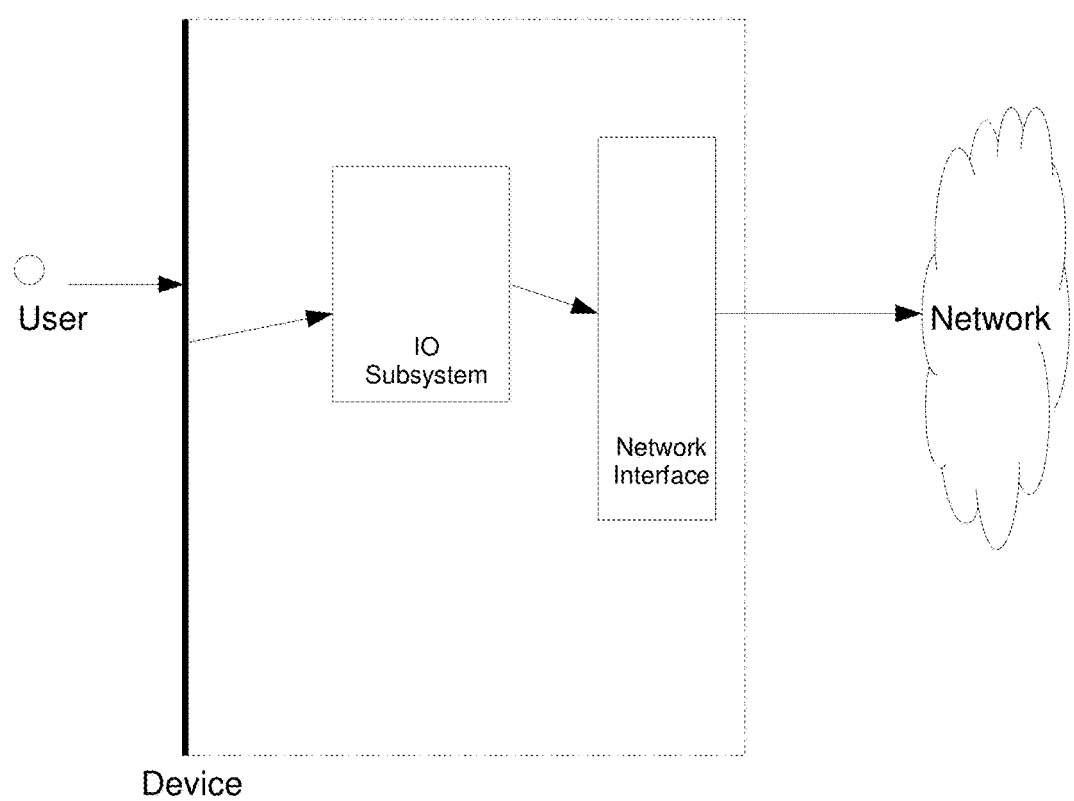

FIG. 9 This figure displays the newAuth client in detail. NewAuth client is the component which runs within the device that a user needs to access. NewAuth client has two subsystems, one is the IO subsystem and the other is Network interface. IO subsystem deals with interfacing with the user and network interface is responsible for interfacing with the newAuth server. Settings related to display, such as whether to display one or more images at a time and default settings for how long to wait for user's input etc are kept in the IO subsystem. The core information about the device such as identifying information, location information, services performed by the device etc are kept in the network Interface.

Figure 10:
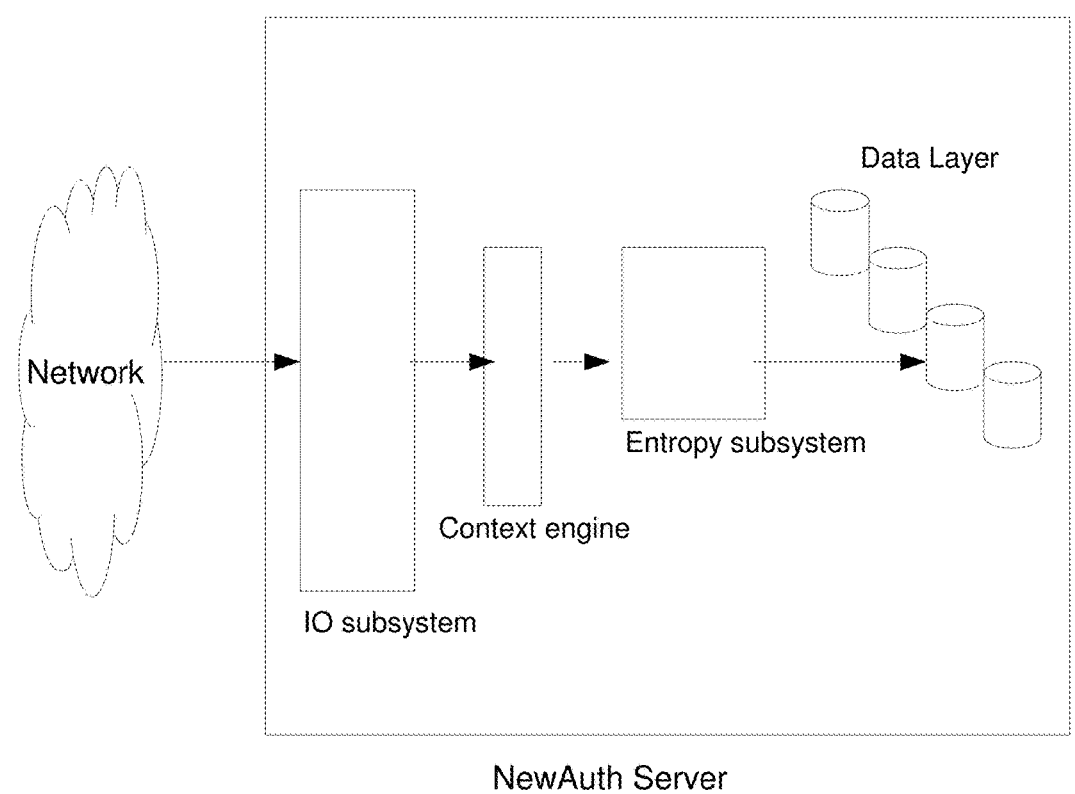

FIG. 10 This figure displays the newAuth server in detail. NewAuth server is the component which houses the processing logic of the system. The processing logic of the system is concerned with storing of the images, generating a random subset of images, estimating the risk level of a transaction, sending and receiving of authentication challenges to the newAuth client and verifying client's response. The individual components of the newAuth server have been described elsewhere in the specification (page 11-12).

Throughout the application, newAuth server has been referred to as a remote component of the newAuth system. But, it is possible to have the server and client on the same machine. It is possible to think of newAuth as being a replacement of the traditional login screen of a personal computer. In that kind of usage, the user, upon getting ownership of a personal computer, will need to setup the images and segments on those images as mentioned in this application. Thereafter, upon each login attempt, the system will challenge the user with a continuously changing password. Potentially increasing the challenge size upon a failed login and providing other features which have been described in this application.

Figure 11A:
Figure 11A:
Figure 11B:
Figure 11B:

FIG. 11a This figure displays another embodiment of the invention. This embodiment has been described under "Very high resolution images" on page 22. In this embodiment, instead of the server sending different images, the server sends the zoomed in version of the segment selected by the user. Picture in 11a.ii is the zoomed in version of the segment selected on FIG. 11a.i The selected segment is showed by a highlighted grid superimposed on the image (FIG. 11a.i). Just as an example, the password generated by user's action is also displayed. The password in FIG. 11a.ii is "21". This is the unique identifier of the segment selected by the user on the image in FIG. 11a.i FIG. 11b This figure further displays the "Very high resolution images" embodiment. FIG. 11b.i is the further enlargement of the segment selected in FIG. 11a.ii. This selection generates the password "21-12". Likewise, FIG. 11b.ii is the further enlargement of the segment selected on the image in FIG. 11b.i and this action generates the password "21-12-11". We can see that the server can change the difficulty of challenge by changing the levels to which it keeps zooming. In the example of FIGS. 11a and 11b the server could stop at FIG. 8b.i and after the user clicks the correct segment on the image shown in FIG. 11b.i, the server could authenticate the user. In that case, the server will not show the image in FIG. 11b.ii and either display the "Authentication Successful" type message explicitly or take the user to the next logical step depending upon the usage. Alternatively, the server could display the image of FIG. 11b.ii and request user to select the next segment.

FIGS. 11a and 11b is a proof of concept display. It does not reflect the actual system. As mentioned elsewhere in the specification, a system with images containing only 4 segments could be very insecure.

What is claimed is:

1. A method to authenticate a user, the method comprising:
   a. displaying, by a device, a current high resolution image that represents a high resolution image associated with said user;
   b. dividing said current high resolution image into a grid layout, wherein dividing into a grid layout said high resolution image comprises dividing said current high resolution image into a set of grid cells that comprises a plurality of grid cells representing said current high resolution image and each grid cell from said set of grid cells being associated with a unique value of a set of unique values of a plurality of values;
   c. selecting, by the user, a grid cell from the set of grid cells,
   d. generating a set of ordered unique values comprising a unique value associated with said selected grid cell
   e. storing said set of ordered unique values in memory;
   f. updating the display by setting said current high resolution image to an enlarged high resolution image, received by the device from a server, which is a high resolution enlargement of the previously selected grid cell;
   g. repeating step b to obtain a set of grid cells associated with said previously enlarged high resolution image;
   h. selecting, by the user, a grid cell from the set of grid cells associated with said previously enlarged high resolution image to concatenate a unique value associated with said selected grid cell from the set of grid cells associated with said previously enlarged high resolution image to said set of ordered unique values previously stored in memory;
   i. repeating steps f through h until said stored set of ordered unique values has a predetermined number of unique values;
   j. creating a user account stored in a data store and, wherein said user account comprises the high resolution image and, the stored set of ordered unique values; and
   k. authenticating said user by repeating steps a through i and matching said stored set of ordered unique values to said stored set of ordered unique values stored in the user account, wherein the predetermined number during authentication is based on a risk rating of a client that is performing the authentication and may be less than the number of unique values in said stored set of ordered unique values stored in the data associated with said user account if the client is assigned a lower risk rating.

* * * * *